US007140710B2

(12) United States Patent
Marra, III et al.

(10) Patent No.: US 7,140,710 B2
(45) Date of Patent: Nov. 28, 2006

(54) DOT MANAGEMENT FOR AN IMAGING APPARATUS

(75) Inventors: Michael Anthony Marra, III, Lexington, KY (US); Randall David Mayo, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 244 days.

(21) Appl. No.: 10/878,236

(22) Filed: Jun. 28, 2004

(65) Prior Publication Data

US 2005/0285890 A1 Dec. 29, 2005

(51) Int. Cl.
*B41J 2/205* (2006.01)
*G06K 15/02* (2006.01)

(52) U.S. Cl. .......................... 347/15; 358/1.2; 358/1.9

(58) Field of Classification Search ................. 347/15, 347/43, 16; 358/1.2, 1.9, 521, 534
See application file for complete search history.

(56) References Cited

U.S. PATENT DOCUMENTS

| | | | |
|---|---|---|---|
| 4,068,241 | A | 1/1978 | Yamada |
| 4,198,642 | A | 4/1980 | Gamblin |
| 4,272,771 | A | 6/1981 | Furukawa |
| 4,401,991 | A | 8/1983 | Martin |
| 4,714,964 | A | 12/1987 | Sasaki |
| 5,469,198 | A | 11/1995 | Kadonaga |
| 5,592,592 | A | 1/1997 | Shu |
| 5,600,351 | A | 2/1997 | Holstun et al. |
| 5,604,597 | A | 2/1997 | Imai |
| 5,638,107 | A | 6/1997 | Curry |
| 5,920,653 | A | 7/1999 | Silverstein |
| 5,943,072 | A | 8/1999 | Robert et al. |
| 5,949,453 | A | 9/1999 | Harris et al. |
| 6,099,104 | A | 8/2000 | Sato et al. |
| 6,099,108 | A | 8/2000 | Weber et al. |
| 6,135,655 | A | 10/2000 | Magirl |
| 6,149,260 | A | 11/2000 | Minakuti |
| 6,154,228 | A | 11/2000 | Okuda et al. |
| 6,238,037 | B1 | 5/2001 | Overall et al. |
| 6,257,685 | B1 | 7/2001 | Ishikawa |
| 6,270,185 | B1 | 8/2001 | Askeland |
| 6,283,571 | B1 | 9/2001 | Zhou et al. |
| 6,290,315 | B1 | 9/2001 | Sayama |
| 6,299,284 | B1 | 10/2001 | Alfaro |
| 6,305,775 | B1 | 10/2001 | Ohtsuka et al. |
| 6,312,096 | B1 | 11/2001 | Koitabashi et al. |
| 6,318,832 | B1 | 11/2001 | Bates et al. |
| 6,328,400 | B1 | 12/2001 | Yonekubo et al. |
| 6,336,701 | B1 | 1/2002 | Hickman |
| 6,338,542 | B1 | 1/2002 | Fujimori |
| 6,367,908 | B1 | 4/2002 | Serra et al. |
| 6,406,111 | B1 | 6/2002 | Klassen et al. |
| 6,406,115 | B1 | 6/2002 | Mantell et al. |
| 6,406,116 | B1 | 6/2002 | Katakura et al. |
| 6,411,399 | B1 | 6/2002 | Mantell et al. |

(Continued)

*Primary Examiner*—Lamson Nguyen
(74) *Attorney, Agent, or Firm*—Taylor & Aust

(57) ABSTRACT

A method for performing drop placement by an imaging apparatus utilizing diluted color inks and full strength color inks includes defining a matrix that identifies all possible drop locations at an output resolution; defining primary drop locations in the matrix for at least one color based on predefined criteria, the at least one color including a diluted color; defining secondary drop locations in the matrix for the at least one color; and establishing rules to assign input data received at an input resolution to particular locations of the primary drop locations and the secondary drop locations in the matrix.

20 Claims, 7 Drawing Sheets

U.S. PATENT DOCUMENTS

| | | | |
|---|---|---|---|
| 6,412,909 | B1 | 7/2002 | Tayuki et al. |
| 6,457,806 | B1 | 10/2002 | Hickman |
| 6,464,330 | B1 | 10/2002 | Miller et al. |
| 6,471,322 | B1 | 10/2002 | Kanda et al. |
| 6,474,779 | B1 | 11/2002 | Inui et al. |
| 6,570,672 | B1 | 5/2003 | Hattori |
| 6,587,222 | B1 | 7/2003 | Nishikawa |
| 6,631,964 | B1 | 10/2003 | Askeland et al. |
| 6,631,972 | B1 | 10/2003 | Yazawa |
| 6,705,699 | B1 | 3/2004 | Du et al. |
| 2002/0105557 | A1 | 8/2002 | Teshigawara et al. |
| 2002/0140950 | A1 | 10/2002 | Ohta et al. |
| 2002/0163654 | A1 | 11/2002 | Levantovsky |
| 2002/0167678 | A1 | 11/2002 | Shiraishi |
| 2002/0186383 | A1 | 12/2002 | Obrador |
| 2003/0038952 | A1 | 2/2003 | Matsukubo et al. |
| 2003/0053086 | A1 | 3/2003 | Chen et al. |
| 2003/0164964 | A1 | 9/2003 | Katsuyama |
| 2003/0174345 | A1 | 9/2003 | Kato et al. |
| 2004/0001207 | A1 | 1/2004 | Nishimura |
| 2004/0042047 | A1* | 3/2004 | Kawatoko et al. ......... 358/3.06 |

* cited by examiner

DOT MANAGEMENT FOR AN IMAGING APPARATUS

BACKGROUND OF THE INVENTION

1. Field of the Invention

The present invention relates to imaging, and, more particularly, to dot management for an imaging apparatus, such as an ink jet printer.

2. Description of the Related Art

An imaging apparatus in the form of an ink jet printer typically forms an image on a print medium by ejecting ink from at least one ink jet printhead to form a pattern of ink dots on the print medium. Such an ink jet printer includes a reciprocating printhead carrier that transports one or more ink jet printheads across the print medium along a bi-directional scanning path defining a print zone of the printer. The bi-directional scanning path is oriented parallel to a main scan direction, also commonly referred to as the horizontal direction. During each scan of the printhead carrier, the print medium is held stationary. An indexing mechanism is used to incrementally advance the print medium in a sheet feed direction, also commonly referred to as a sub-scan direction, through the print zone between scans in the main scan direction, or after all data intended to be printed with the print medium at a particular stationary position has been completed.

For a given stationary position of the print medium, printing may take place during unidirectional or bi-directional scans of the printhead carrier. The height of the printhead generally defines a printing swath as ink is deposited on the print medium during a particular scan of the printhead carrier. A printing swath is made of a plurality of printing lines traced along imaginary rasters, the imaginary rasters being spaced apart in the sheet feed direction, e.g., vertically. In order to form the pattern of ink drops on the print medium, a rectilinear array, also known as a matrix, of possible pixel, i.e., drop, locations is defined within the printable boundaries of the print medium. The closest possible spacing of ink drops in the main scan direction is typically referred to as the horizontal resolution, and the closest possible spacing of ink drops in the sub-scan direction, i.e., between adjacent rasters, is typically referred to as the vertical resolution.

The quality of printed images produced by an ink jet printer depends in part on the resolution of the printer. Typically, higher or finer resolutions, where the printed dots are more closely spaced, results in higher quality images. Increasing the resolution of an ink jet printer increases the number of dots to be printed in a unit area by the product of the increase factor in each dimension in the grid. For example, doubling the print resolution from 300 dpi (dots, or drops, per inch) to 600 dpi in a matrix results in four times as many dots per unit area.

Printing quality using an ink jet printer of the type described above can be further improved by using a technique commonly referred to as shingling, or interlaced printing, wherein consecutive printing swaths are made to overlap and only a portion of the ink drops for a given print line, i.e., raster, are applied to the print medium on a given pass of the printhead. For example, in one known shingling mode using 50% shingling, approximately 50% of the dots for a particular color are placed on any given pass of the printhead, thereby requiring two passes of the printhead to completely print a particular raster. The candidate dots of the first pass of the printhead may be selected according to a checkerboard pattern. The remaining 50% of the dots are placed on a subsequent pass of the printhead.

In typical shingling methods, however, as resolution increases, so does the number of passes of the printhead required to print the image data. Accordingly, while increasing resolution and using shingling patterns to mask printing defects increases the printing quality, such an approach that significantly increases the number of printing passes may not be optimum from an efficiency standpoint in terms of throughput of the printer.

What is needed in the art is a printing method that distributes dots among a plurality of passes without increasing the number of passes that are required to print an image at a predetermined resolution.

SUMMARY OF THE INVENTION

The present invention provides a printing method that distributes dots among a plurality of passes without increasing the number of passes that are required to print an image at a predetermined resolution.

The present invention, in one form thereof, relates to a method for performing drop placement by an imaging apparatus utilizing diluted color inks and full strength color inks. The method includes defining a matrix that identifies all possible drop locations at an output resolution; defining primary drop locations in the matrix for at least one color based on predefined criteria, the at least one color including a diluted color; defining secondary drop locations in the matrix for the at least one color; and establishing rules to assign input data received at an input resolution to particular locations of the primary drop locations and the secondary drop locations in the matrix.

The present invention, in another form thereof, is directed to a method for performing drop placement by an imaging apparatus. The method includes defining a matrix that identifies all possible drop locations at an output resolution; defining primary drop locations in the matrix for at least one color based on predefined criteria; defining secondary drop locations in the matrix for the at least one color; establishing rules to assign input data received at an input resolution to particular locations of the primary drop locations and the secondary drop locations in the matrix; receiving the input data at the input resolution; and applying the rules to map the input data to the particular locations in the matrix to generate output data at the output resolution.

One advantage of the present invention is that, for a given output resolution, high resolution printing can be performed without requiring an increase in the number of print passes as required with traditional shingling methodologies, while retaining the increase in print quality provided by such methodologies.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
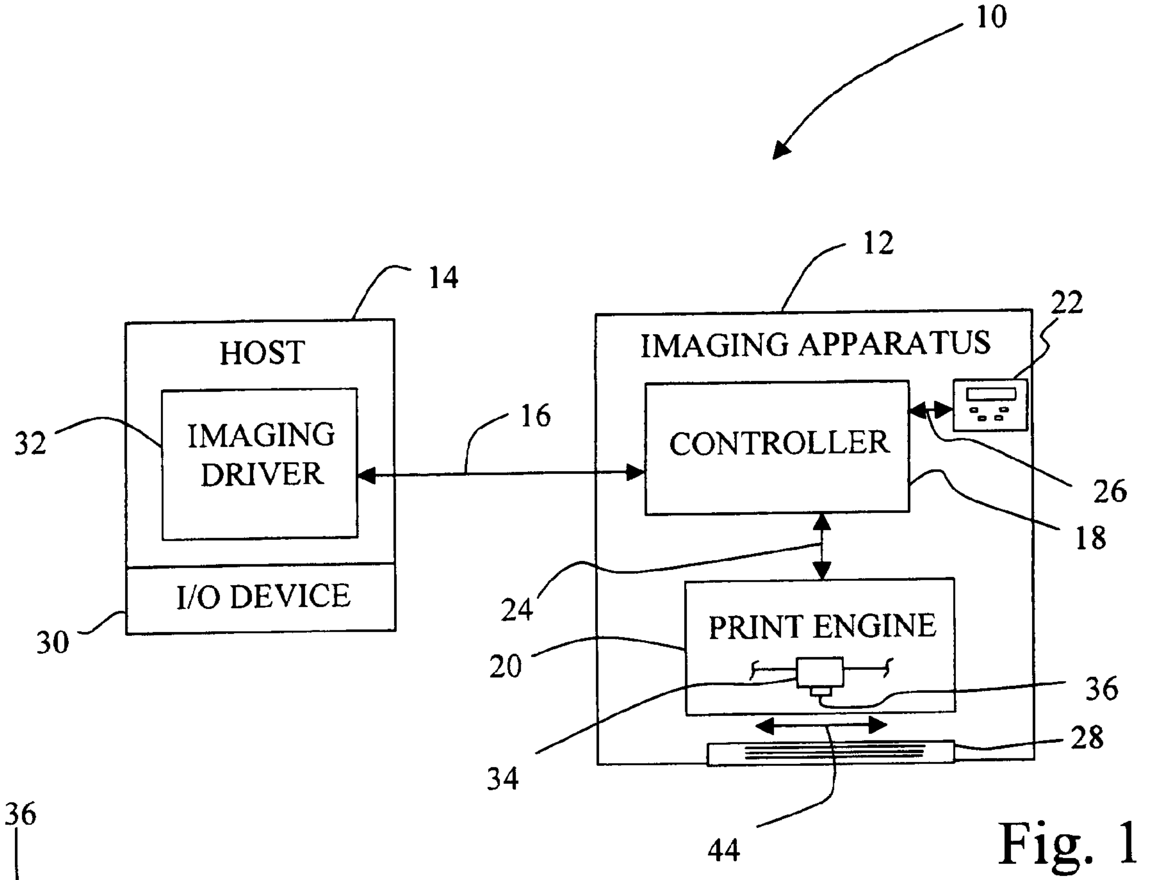
FIG. 1 is a diagrammatic representation of a system employing an embodiment of the present invention.

There is shown FIG. 1 a diagrammatic depiction of a system 10 embodying the present invention. System 10 may include an imaging apparatus 12 and a host 14, with imaging apparatus 12 communicating with host 14 via a communications link 16. Alternatively, imaging apparatus 12 may be a standalone unit that is not communicatively linked to a host, such as host 14. For example, imaging apparatus 12 may take the form of a multifunction machine that includes standalone copying and facsimile capabilities, in addition to optionally serving as a printer when attached to a host, such as host 14.

Imaging apparatus 12 may be, for example, an ink jet printer and/or copier. Imaging apparatus 12 includes a controller 18, a print engine 20 and a user interface 22.

Controller 18 includes a processor unit and associated memory, and may be formed as an Application Specific Integrated Circuit (ASIC). Controller 18 communicates with print engine 20 via a communications link 24. Controller 18 communicates with user interface 22 via a communications link 26.

In the context of the examples for imaging apparatus 12 given above, print engine 20 may be, for example, an ink jet print engine configured for forming an image on a print medium 28, such as a sheet of paper, transparency or fabric.

Host 14 may be, for example, a personal computer including an input/output (I/O) device 30, such as keyboard and display monitor. Host 14 further includes a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 32, e.g., printer driver software, for imaging apparatus 12. Imaging driver 32 is in communication with controller 18 of imaging apparatus 12 via communications link 16. Imaging driver 32 facilitates communication between imaging apparatus 12 and host 14, and may provide formatted print data to imaging apparatus 12, and more particularly, to print engine 20.

Alternatively, however, all or a portion of imaging driver 32 may be located in controller 18 of imaging apparatus 12. For example, where imaging apparatus 12 is a multifunction machine having standalone capabilities, controller 18 of imaging apparatus 12 may include an imaging driver configured to support a copying function, and/or a fax-print function, and may be further configured to support a printer function. In this embodiment, the imaging driver facilitates communication of formatted print data, as determined by a selected print mode, to print engine 20.

Communications link 16 may be established by a direct cable connection, wireless connection or by a network connection such as for example an Ethernet local area network (LAN). Communications links 24 and 26 may be established, for example, by using standard electrical cabling or bus structures, or by wireless connection.

Print engine 20 may include, for example, a reciprocating printhead carrier 34 that carries at least one ink jet printhead 36, and may be mechanically and electrically configured to mount, carry and facilitate multiple cartridges, such as a monochrome printhead cartridge and/or one or more color printhead cartridges, each of which includes a respective printhead 36. For example, in systems using cyan, magenta, yellow and black inks, printhead carrier 34 may carry four printheads, one printhead for each of cyan, magenta, yellow and black. As a further example, a single printhead, such as printhead 36, may include multiple ink jetting arrays, with each array associated with one color of a plurality of colors of ink. In such a printhead, for example, printhead 36 may include cyan, magenta, and yellow nozzle arrays for respectively ejecting full strength cyan (C) ink, full strength magenta (M) ink and yellow (Y) ink.

Figure 2:
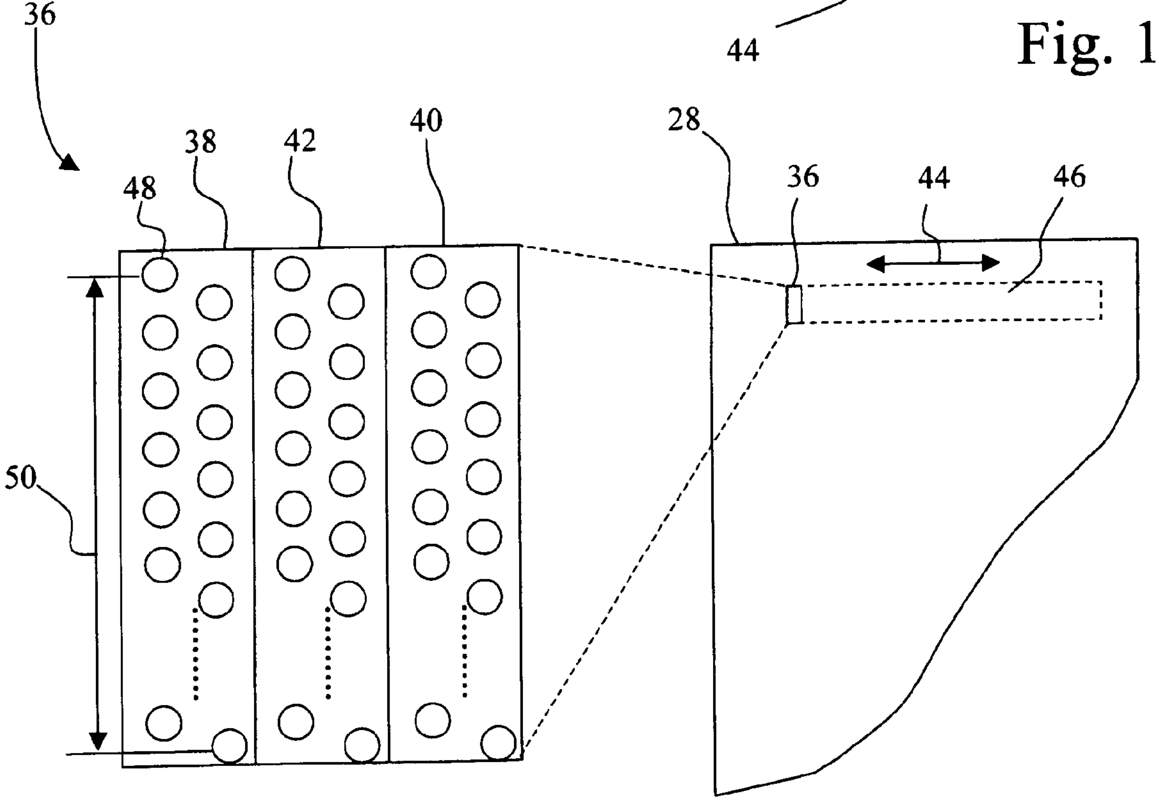
FIG. 2 is a diagrammatic representation of a printhead defining a swath on a print medium.

In another example, as shown in FIG. 2, printhead 36 may include a dilute cyan nozzle array 38, a dilute magenta nozzle array 40 and black nozzle array 42, for respectively ejecting dilute cyan (c) ink, dilute magenta (m) ink and black ink (K). The term, dilute, is used for convenience to refer to a ink that does not have a luminance intensity as high as that associated with a corresponding full strength ink of substantially the same chroma, and thus, such dilute inks may be, for example, either dye based or pigment based. While in this example black nozzle array 42 is positioned between dilute cyan nozzle array 38 and dilute magenta nozzle array 40, those skilled in the art will recognize that the order of the nozzle arrays is not critical to the present invention, and that other color combinations may be used without departing from the scope of the present invention. Where printhead 36 includes dilute cyan (c), dilute magenta (m) and black (K) nozzle arrays 38, 40, 42, a second printhead that includes full strength cyan, magenta, and yellow nozzle arrays may also be loaded in printhead carrier 34 to facilitate six-color printing, as may often be the case when printing in a photographic quality mode with imaging apparatus 12.

Printhead carrier 34 is controlled by controller 18 to move printhead 36 in a reciprocating manner along a bi-directional scan path 44, which will also be referred to herein as horizontal direction 44. Each left to right, or right to left movement of printhead carrier 34 along bi-directional scan path 44 over print medium 28 will be referred to herein as a pass. The area traced by printhead 36 over print medium 28 for a given pass will be referred to herein as a swath, such as for example, swath 46 as shown in FIG. 2.

In the exemplary nozzle configuration for ink jet printhead 36 shown in FIG. 2, each of nozzle arrays 38, 40 and 42 include a plurality of ink jetting nozzles 48. As within a particular nozzle array, or as from one nozzle array in comparison to another, the nozzle size may be, but need not be, the same size. A swath height 50 of swath 46 corresponds to the distance between the uppermost and lowermost of the nozzles of printhead 36.

In order for print data from host 14 to be properly printed by print engine 20, the rgb data generated by host 14 must be converted into data compatible with print engine 20 and printhead 36.

Figure 3:
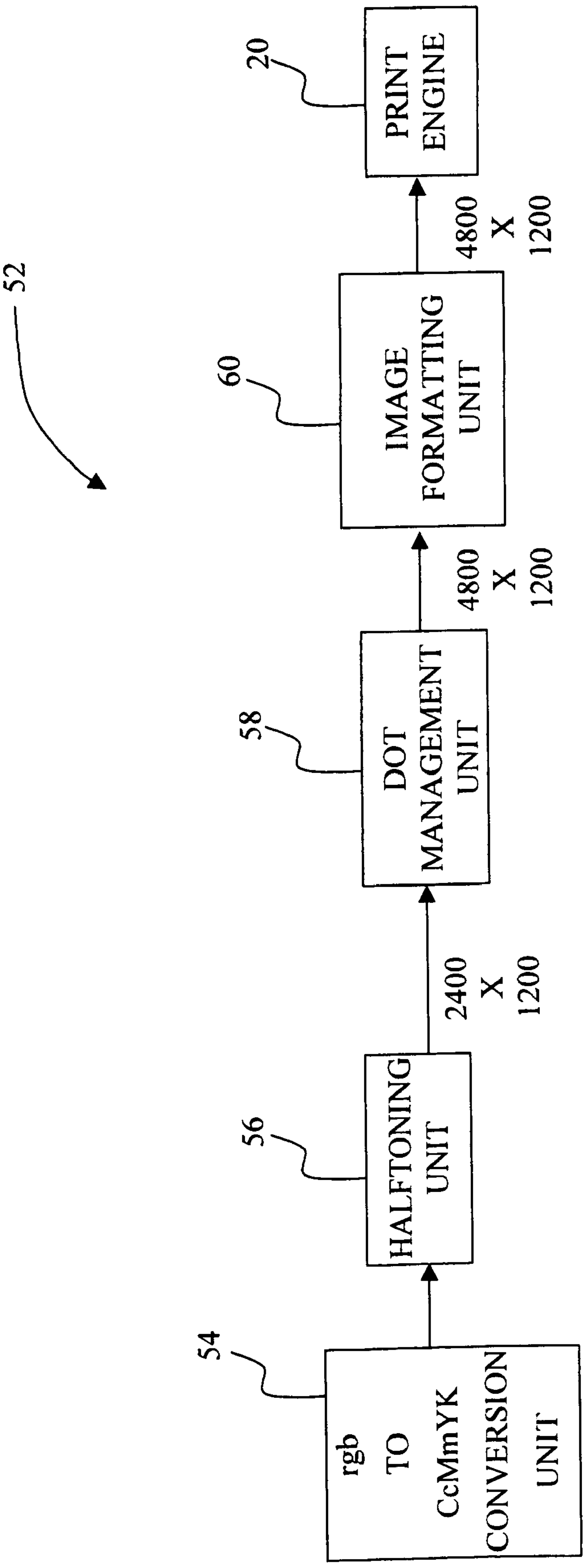
FIG. 3 is a block diagram of an embodiment of a data conversion unit that may be utilized in the imaging system of FIG. 1.

FIG. 3 is a block diagram of an exemplary data conversion unit 52 that is used to convert rgb data, generated for example by host 14, into data compatible with print engine 20. Data conversion unit 52 may be in the form of software or firmware. Data conversion unit 52 may be located in imaging driver 32 of host 14, in controller 18 of imaging apparatus 12, or a portion of data conversion unit 52 may be located in each of imaging driver 32 and controller 18.

Data conversion unit 52 includes an rgb-to-CcMmYK conversion unit 54, a halftoning unit 56, a dot management unit 58, and an image formatting unit 60. In general, conversion unit 54 takes signals from one color space domain and converts them into signals of another color space domain for each image generation. As is well known in the art, color conversion takes place to convert from a light-generating color space domain of, for example, a color display monitor that utilizes primary colors red (r), green (g) and blue (b) to a light-reflective color space domain of, for example, a color printer that utilizes colors, such as for example, cyan (C, c), magenta (M, m), yellow (Y) and black (K).

As shown, rgb data, such as the output from an application executed on host 14, is supplied to rgb-to-CcMmYK conversion unit 54 to generate CcMmYK continuous tone data. The CcMmYK continuous tone data is then processed by halftoning unit 56 to generate CcMmYK halftoned image data which may be, for example, in an input resolution of 2400(H)×1200(V) dpi. The CcMmYK halftoned image data at the predefined input resolution, e.g., 2400×1200 dpi, is then processed by dot management unit 58, which in turn assigns the halftoned image data to particular locations in a matrix (see, e.g., FIG. 5) at a predefined output resolution, e.g. 4800×1200 dpi, to produce bitmapped image data. The bitmapped image data in turn is supplied to image formatting unit 60, which outputs formatted image data at a desired format and output resolution, e.g., 4800×1200 dpi, for use by print engine 20.

In accordance with the present invention, dot management unit 58, which may be in the form of software and/or firmware, and may utilize one or more lookup tables, performs a computer implemented method that takes the halftoned data from halftoning unit 56 and expands it prior to formatting the data for printing. This computer implemented method includes a set of rules that ensure that no consecutive drops will be printed on the same print pass with the same ink jet nozzle. Also, the placement of drops is coordinated to distribute the drops between print passes, and to distribute the different color drops between print passes, in such a way as to lessen the effects of print engine mechanism and printhead errors.

Figure 4:
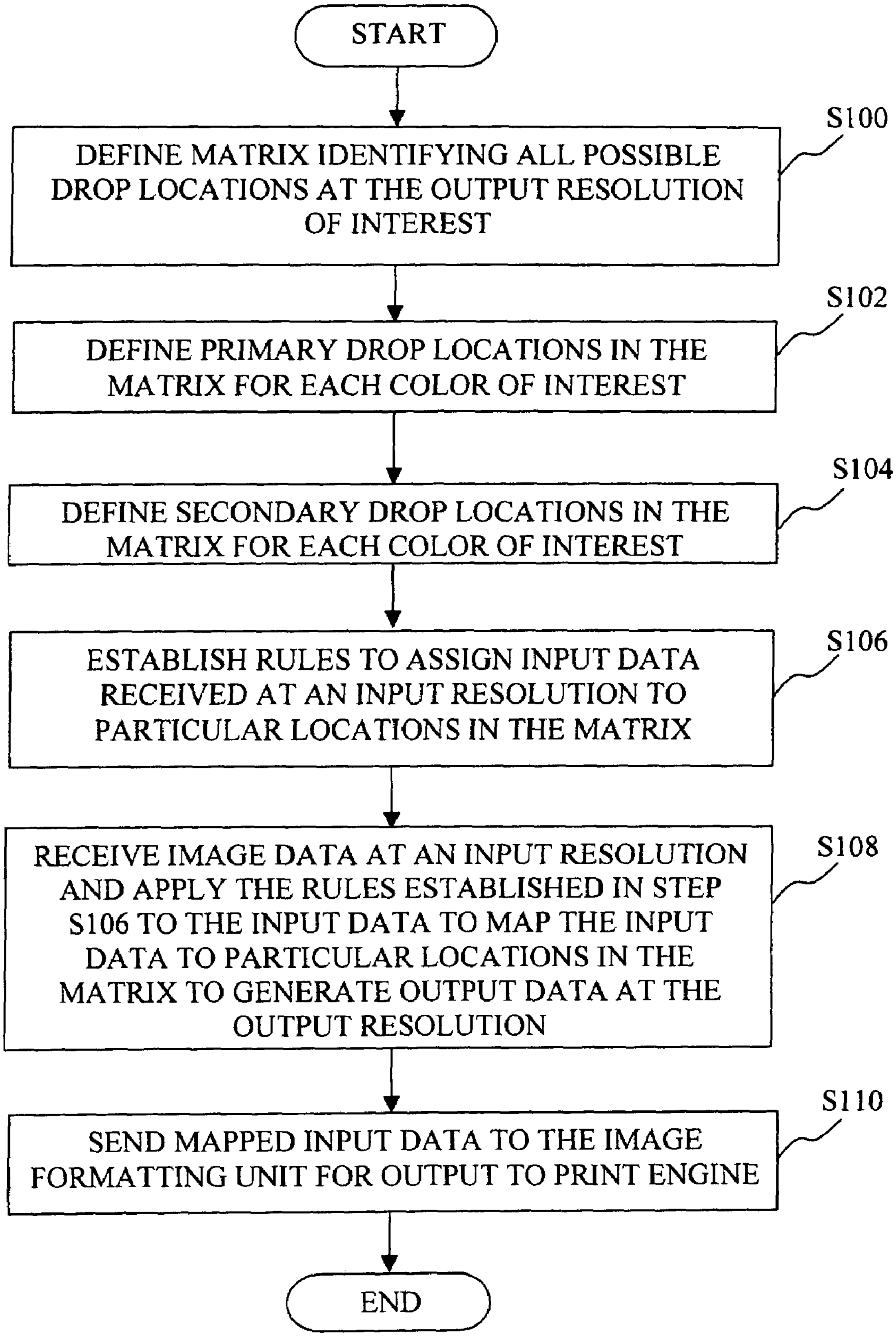
FIG. 4 is a general flowchart of a method in accordance with the present invention.

FIG. 4 is a general flow chart of a method in accordance with the present invention.

At step S100, a matrix is defined that identifies all possible drop locations at the output resolution of interest. As used herein, resolution will be described in terms of horizontal resolution (H) by vertical resolution (V), e.g., a resolution of H×V dpi, wherein dpi represents dots, or drops, per inch.

Figure 5:
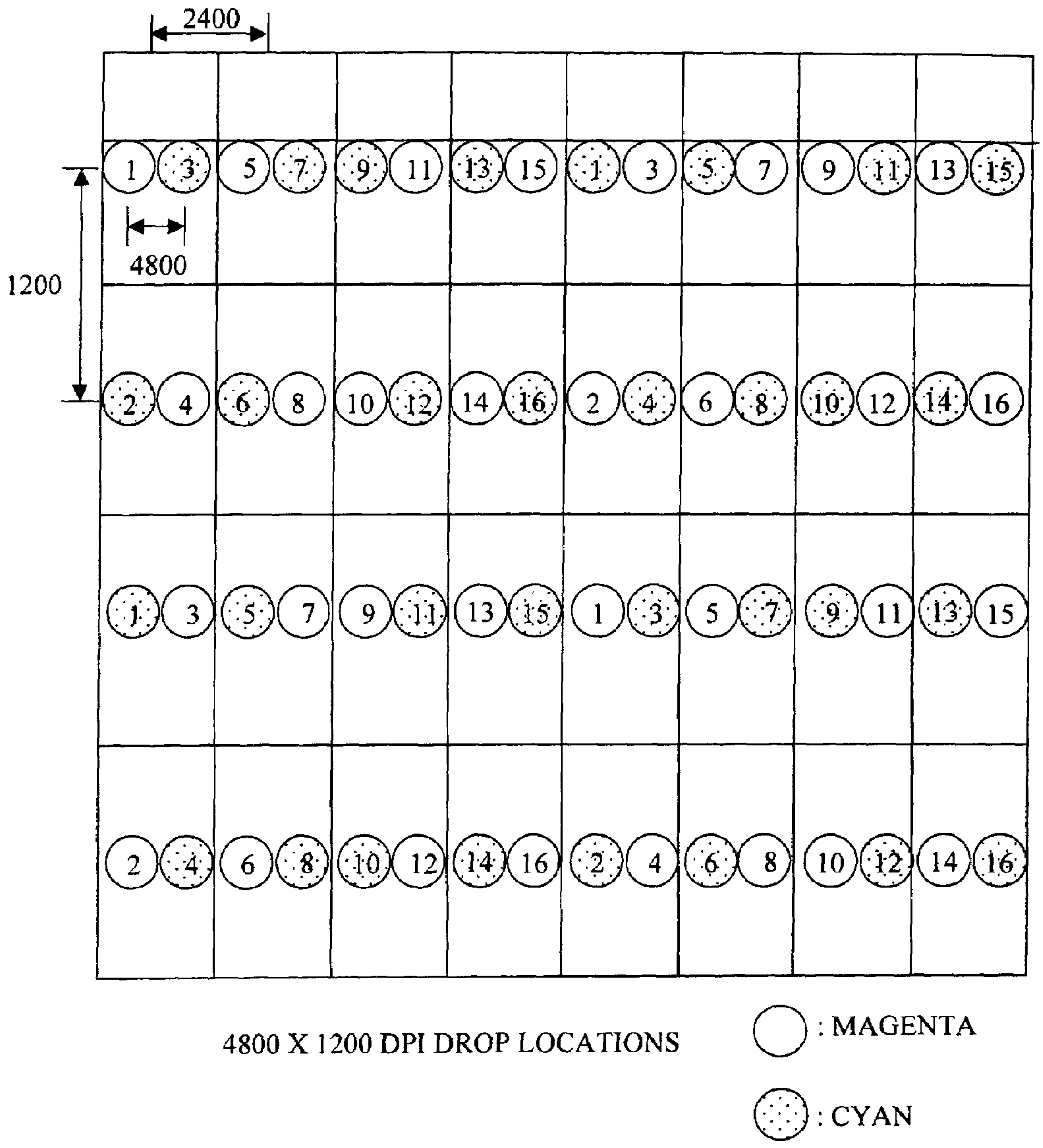
FIG. 5 shows a pictorial example of a portion of a matrix identifying primary locations for cyan and magenta at an output resolution of interest, in this example, of 4800×1200 dpi.

FIG. 5 shows a pictorial example of a portion of such a matrix for both dilute cyan (c) and dilute magenta (m). Also, each of the locations is assigned a pass number of a plurality of pass numbers indicating a particular pass of a printhead in which a particular location can receive an ink drop. The pass number is represented by the number in the particular circle. In the example of FIG. 5, for 2400 (V)×1200 (H) dpi resolution input data, drop locations are defined to generate an output resolution of 4800×1200 dpi.

At step S102, primary drop locations are defined in the matrix for each color of interest (e.g., dilute cyan (c) and dilute magenta (m)) based, for example, on predefined criteria. Each of the primary locations for a particular color is assigned a pass number of a plurality of pass numbers indicating a particular pass of a printhead in which a particular primary location of the primary locations can receive an ink drop of the particular color. The pass numbers for the primary locations correspond to the pass numbers originally assigned for each of the drop locations for the entire matrix, discussed above in step S100.

The criteria may be in the form of a set of rules, such as for example:

Rule P1: Primary locations are assigned based on raster and column.

Rule P2: No consecutive 600 dpi drops of the same color is permitted on the same pass, so as to limit the firing frequency per nozzle.

Rule P3: Dominant colors, e.g., cyan and magenta, are assigned different primary locations to mask print mechanism and printhead errors. A non-dominant color, e.g., yellow, will share primary locations with the primary locations for the dominant colors. Alternatively, by further increasing the horizontal output resolution, e.g., 7200 dpi, for a given input resolution, e.g., 1200 dpi, it is possible to define additional drop locations such that a non-dominant color need not share its primary drop locations with the primary drop locations of a dominant color.

In the example shown in FIG. 5, for the top two consecutive rasters there are a total of sixteen passes, with primary magenta dots being placed on odd numbered passes and primary cyan dots being placed on even numbered passes. This pattern reverses for the next two consecutive rasters.

At step S104, secondary drop locations are defined in the matrix for each color of interest based, for example, on predefined criteria. In general, secondary drop locations are those locations which are not primary locations for the particular color of interest. Each of the secondary locations for a particular color is assigned a pass number of the plurality of pass numbers indicating a particular pass of a printhead in which a particular secondary location of said secondary locations can receive an ink drop of said particular color. The pass numbers for the secondary locations correspond to the pass numbers originally assigned for each of the drop locations for the entire matrix, discussed above in step S100.

In the example depicted in FIG. 5, the dilute magenta (m) secondary locations correspond to the dilute cyan (c) primary locations, and the dilute cyan (c) secondary locations correspond to the dilute magenta (m) primary locations.

At step S106, rules are established in order to assign the input data received from halftoning unit 56 to particular locations in the matrix. Exemplary rules are as follows:

Rule A1: No consecutive 600 dpi drops of the same color are permitted on the same pass, so as to limit the firing frequency per nozzle. On a per raster basis, if drops are present on adjacent 600 dpi locations (e.g., a separation of four 2400ths of an inch in the example of FIG. 5), those drops must go in their assigned primary locations. This forces adjacent drops to be printed on separate printing passes.

Rule A2: For a drop location that has no horizontally adjacent neighbors on a 600 dpi basis, if the current location has two drops, e.g., one cyan (c) and one magenta (m), and both drops have no horizontally adjacent 600 dpi neighbors, then each drop is placed in its primary 4800 dpi location. The primary locations were assigned in step S102 to produce optimal print quality, and thus, should be used in this scenario, which pertains to dense patterns.

Rule A3: For a drop location that has no horizontally adjacent neighbors on a 600 dpi basis, if the current location has one drop (of any color), the drop is placed in its primary 4800 dpi location, unless there are no 600 dpi neighbors of any color, and a predefined memory bit is set. If all these conditions are set the drop is put in the secondary location and the memory bit is cleared. If the memory bit is cleared and all other conditions are met, the drop is put in the primary location and the memory bit is set. This allows sparsely spaced drops to be moved to different swaths to reduce their print frequency. In addition this will reduce the print defect due to missing or weak nozzles.

At step S108, dot management unit 58 receives image data at an input resolution from halftoning unit 56, and applies the rules established in step S106 to the input data at the input resolution, e.g., 2400×1200 dpi, to map the input data to particular locations in the matrix to generate output data at the output resolution, e.g., 4800×1200 dpi.

At step S110, dot management unit 58 sends the mapped input data to image formatting unit 60, wherein the mapped input data is formatted and supplied to print engine 20.

Each of steps S100, S102, S104 and S106 may be implemented, for example, in a look-up table accessible by dot management unit 58, with step S108 being performed in real time by dot management unit 58 and step S110 being performed in real time by image formatting unit 60. Such a look-up table may be resident, for example, in memory associated with controller 18, imaging driver 32, or other locations in imaging apparatus 12 and/or host 14.

Figure 6:
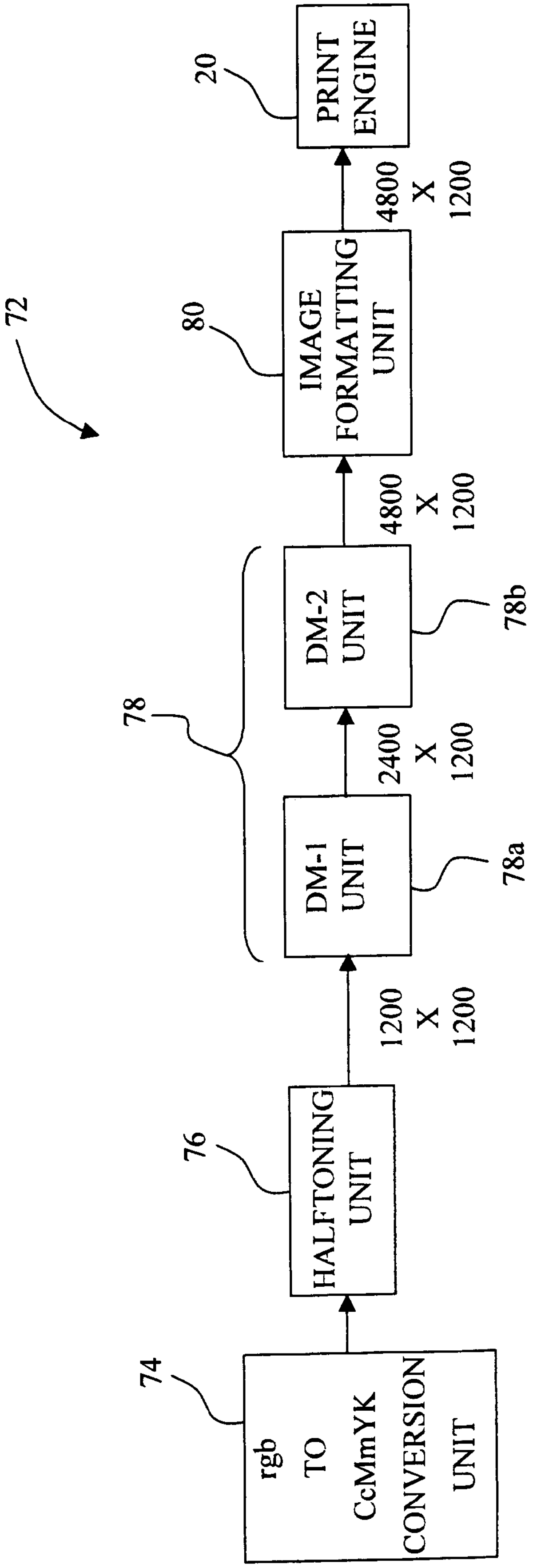
FIG. 6 is a block diagram of another embodiment of a data conversion unit, including two-stage dot management, which may be utilized in the imaging system of FIG. 1.

FIG. 6 is a diagrammatic representation of another embodiment of a data conversion unit 72, including two-stage dot management, which may be utilized in the imaging system of FIG. 1. Data conversion unit 72 is used to convert rgb data, generated for example by host 14, into data compatible with print engine 20. Data conversion unit 72 may be in the form of software or firmware. Data conversion unit 72 may be located in imaging driver 32 of host 14, in controller 18 of imaging apparatus 12, or a portion of data conversion unit 72 may be located in each of imaging driver 32 and controller 18.

Data conversion unit 72 includes an rgb-to-CcMmYK conversion unit 74, a halftoning unit 76, a two-stage dot management unit 78, and an image formatting unit 80. Two-stage dot management unit 78 includes a first dot management unit 78*a* (DM-1) and a second dot management unit 78*b* (DM-2).

Conversion unit 74 takes signals from one color space domain and converts them into signals of another color space domain for each image generation. Color conversion takes place to convert from a light-generating color space domain of, for example, a color display monitor that utilizes primary colors red (r), green (g) and blue (b) to a light-reflective color space domain of, for example, a color printer that utilizes colors, such as for example, cyan (C, c), magenta (M, m), yellow (Y) and black (K).

As shown, rgb data, such as the output from an application executed on host 14, is supplied to rgb-to-CcMmYK conversion unit 74 to generate CcMmYK continuous tone data. The CcMmYK continuous tone data is then processed by halftoning unit 76 to generate CcMmYK halftoned image data which may be, for example, in a particular resolution of 1200(H)×1200(V) dpi. The CcMmYK halftoned image data at the predefined input resolution, e.g., 1200×1200 dpi, is then processed by two-stage dot management unit 78, which in turn assigns the halftoned input, i.e., image, data to particular locations in a matrix (see, e.g., FIGS. 7 and 8) at a predefined output resolution, e.g., 4800×1200 dpi, to produce bitmapped image data. The bitmapped image data in turn is supplied to image formatting unit 80, which outputs formatted image data at a desired format and resolution for use by print engine 20.

Figure 7:
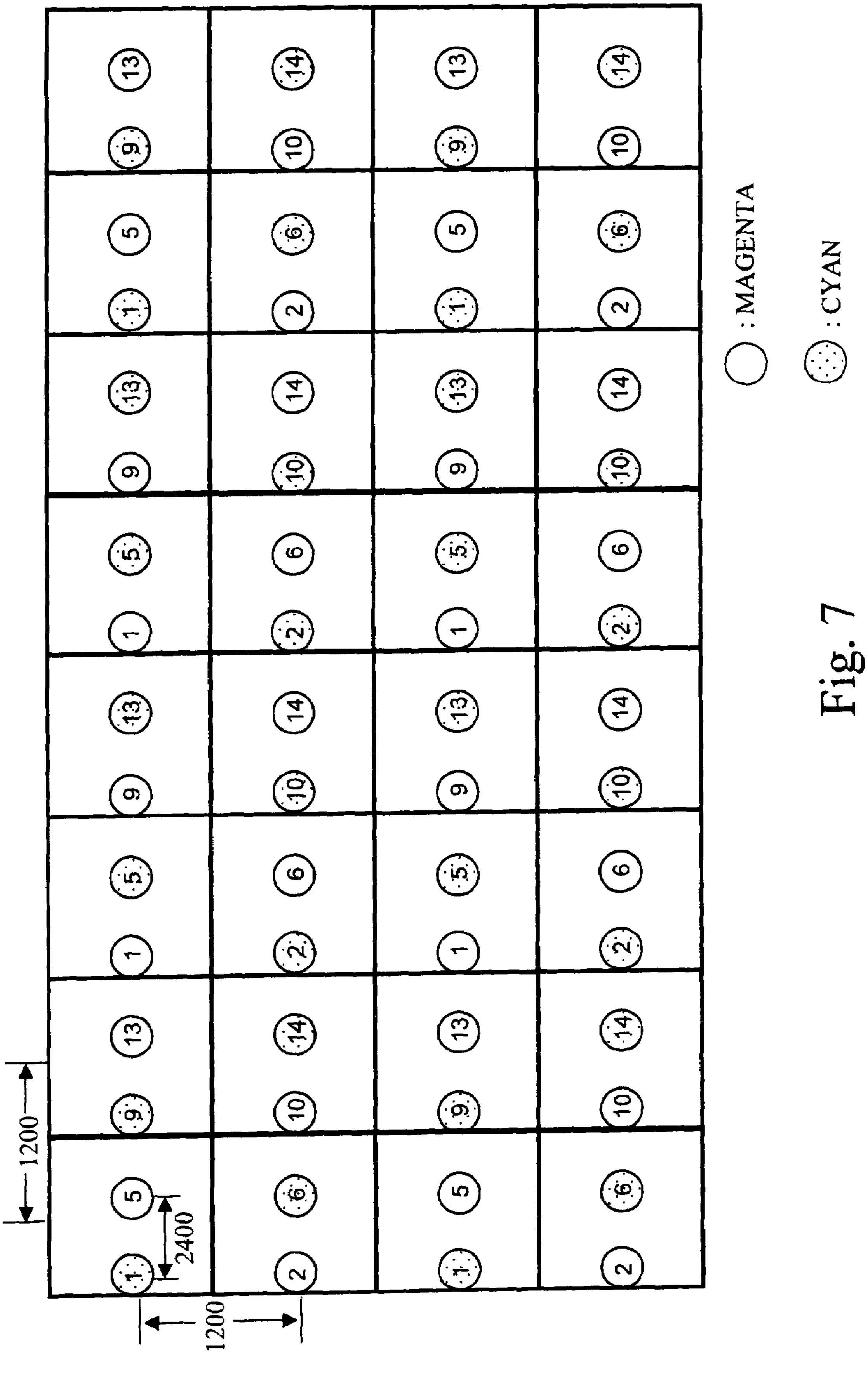
FIG. 7 shows a pictorial example of a portion of a matrix identifying primary locations for cyan and magenta at an output resolution of the DM1-Unit of FIG. 6, in this example, of 2400×1200 dpi.
Figure 8:
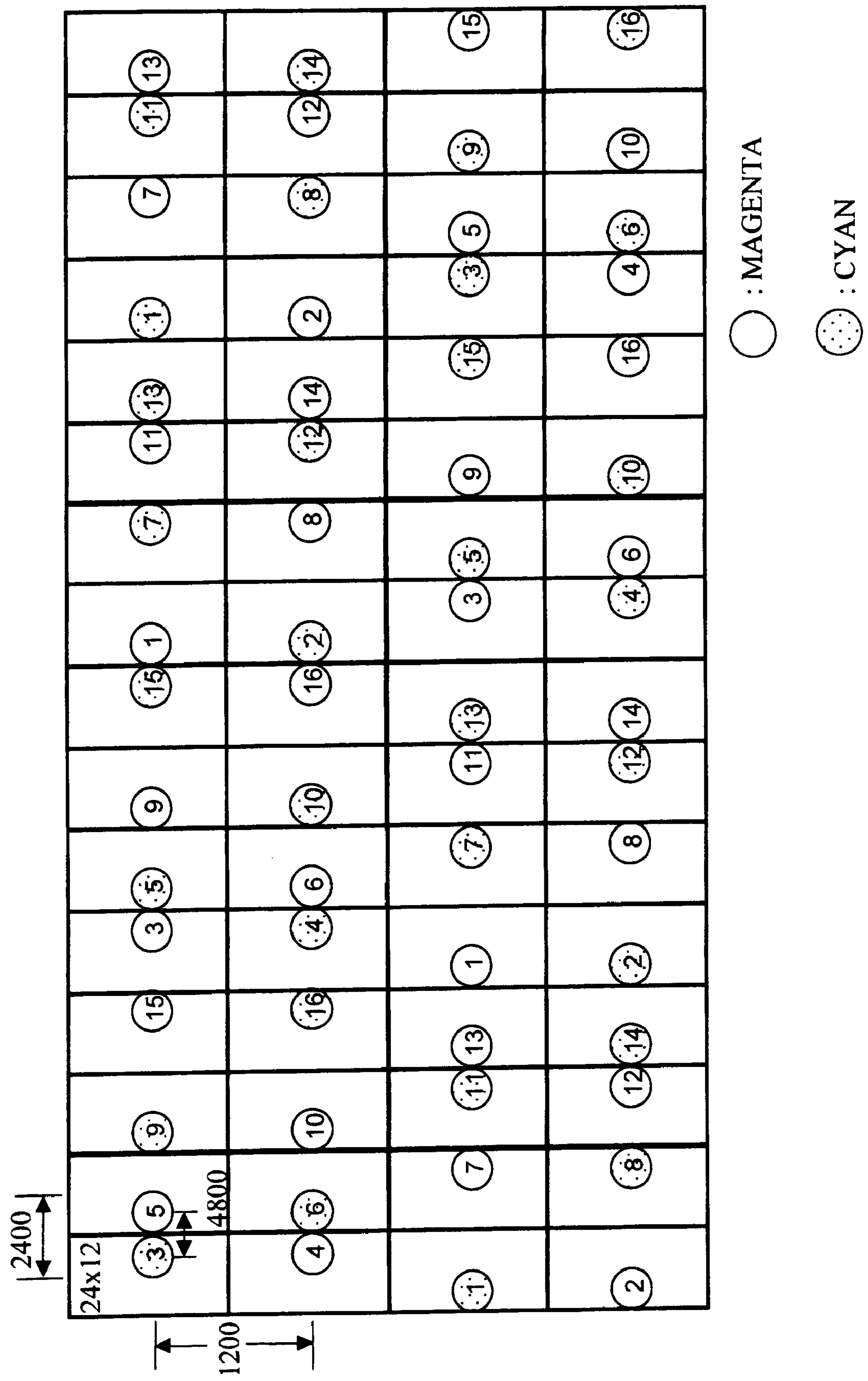
FIG. 8 shows a pictorial example of a portion of the matrix identifying a composite of the primary cyan and magenta locations assigned by the DM-1 Unit as illustrated in FIG. 7 and the primary cyan and magenta locations assigned by the DM-2 Unit, the composite having an output resolution, in this example, of 4800×1200 dpi.

In accordance with this embodiment of the present invention, two-stage dot management unit 78, which may be in the form of software and/or firmware, and may utilize one or more lookup tables, performs a computer implemented method that takes the halftoned input data at the input resolution, e.g., 1200×1200 dpi halftoned input data, from halftoning unit 76 and first processes the halftoned input data in DM-1 78*a* to assign the 1200×1200 input data to matrix locations at an intermediate resolution, e.g., 2400×1200 dpi, as illustrated in FIG. 7. In this example, one dilute cyan (c) and one dilute magenta (m) are permitted in each 2400×1200 location. Thereafter, DM-2 78*b* processes the 2400×1200 data in accordance with the method set forth above in the flowchart of FIG. 4, which for brevity will not be repeated here, to expand the 2400×1200 data to the desired output resolution, e.g., 4800×1200 dpi, as shown in FIG. 8.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for performing drop placement by an imaging apparatus utilizing diluted color inks and full strength color inks, comprising:

defining a matrix that identifies all possible drop locations at an output resolution;

defining primary drop locations in said matrix for at least one color based on predefined criteria, said at least one color including a diluted color;

defining secondary drop locations in said matrix for said at least one color; and establishing rules to assign input data received at an input resolution to particular locations of said primary drop locations and said secondary drop locations in said matrix based on an assessment of said input data with respect to drop placement at adjacent drop locations at a predefined resolution.

2. The method of claim 1, further comprising:

receiving said input data at said input resolution; and applying said rules to map said input data to said particular locations in said matrix to generate output data at said output resolution.

3. The method of claim 1, wherein each of said primary drop locations for a particular color is assigned a pass number of a plurality of pass numbers indicating a particular pass of a printhead in which a particular primary location of said primary drop locations can receive an ink drop of said particular color.

4. The method of claim 1, wherein each of said secondary drop locations for a particular color is assigned a pass number of a plurality of pass numbers indicating a particular pass of a printhead in which a particular secondary location of said secondary drop locations can receive an ink drop of said particular color.

5. The method of claim 1, wherein said at least one color includes a plurality of colors, said rules including a rule that no consecutive drops at said predefined resolution of a same color are permitted on a particular pass of a printhead.

6. The method of claim 1, wherein said at least one color is one of cyan and magenta.

7. The method of claim 1, wherein said output resolution is at least double said input resolution.

8. The method of claim 1, wherein said output resolution is four times said input resolution.

9. A method for performing drop placement by an imaging apparatus utilizing diluted color inks and full strength color inks, comprising:

defining a matrix that identifies all possible drop locations at an output resolution;

defining primary drop locations in said matrix for at least one color based on predefined criteria, said at least one color including a diluted color;

defining secondary drop locations in said matrix for said at least one color;

establishing rules to assign input data received at an input resolution to particular locations of said primary drop locations and said secondary drop locations in said matrix;

receiving said input data at said input resolution;

converting said input data at said input resolution to an intermediate resolution; and applying said rules to map said input data at said intermediate resolution to said particular locations in said matrix to generate output data at said output resolution.

10. A method for performing drop placement by an imaging apparatus utilizing diluted color inks and full strength color inks, comprising:

defining a matrix that identifies all possible drop locations at an output resolution;

defining primary drop locations in said matrix for at least one color based on predefined criteria, said at least one color including a diluted color;

defining secondary drop locations in said matrix for said at least one color; and establishing rules to assign input data received at an input resolution to particular locations of said primary drop locations and said secondary drop locations in said matrix, wherein if input data received for application to said matrix defines drops at adjacent locations at a predefined resolution, said drops are assigned to respective primary drop locations.

11. A method for performing drop placement by an imaging apparatus utilizing diluted color inks and full strength color inks, comprising:

defining a matrix that identifies all possible drop locations at an output resolution;

defining primary drop locations in said matrix for at least one color based on predefined criteria, said at least one color including a diluted color;

defining secondary drop locations in said matrix for said at least one color; and establishing rules to assign input data received at an input resolution to particular locations of said primary drop locations and said secondary drop locations in said matrix, wherein for a current drop location that has no horizontally adjacent neighbors at a predefined resolution, if said current location has two drops of different color, and both of said drops of different color have no horizontally adjacent neighbors at said predefined resolution, then each drop of said drops of different color is placed in its respective primary drop location.

12. The method of claim 11, wherein said two drops of different color is a dilute cyan drop and a dilute magenta drop.

13. A method for performing drop placement by an imaging apparatus utilizing diluted color inks and full strength color inks, comprising:

defining a matrix that identifies all possible drop locations at an output resolution;

defining primary drop locations in said matrix for at least one color based on predefined criteria, said at least one color including a diluted color;

defining secondary drop locations in said matrix for said at least one color; and establishing rules to assign input data received at an input resolution to particular locations of said primary drop locations and said secondary drop locations in said matrix, wherein for a current drop location that has no horizontally adjacent neighbors at a predefined resolution, if said current location has one drop of any color, said one drop of any color is placed in its respective primary drop location, unless there are no neighbors of any color at said predefined resolution and a predefined memory bit is set.

14. The method of claim 13, wherein if there are no neighbors of any color at said predefined resolution, and said predefined memory bit is set, then said one drop of any color is put in its respective secondary location and said memory bit is cleared.

15. The method of claim 13, wherein if there are no neighbors of any color at said predefined resolution, and said memory bit is cleared, said one drop of any color is put in its respective primary location and said memory bit is set.

16. A method for performing drop placement by an imaging apparatus, comprising:

defining a matrix that identifies all possible drop locations at an output resolution;

defining primary drop locations in said matrix for at least one color based on predefined criteria;

defining secondary drop locations in said matrix for said at least one color;

establishing rules to assign input data received at an input resolution to particular locations of said primary drop locations and said secondary drop locations in said matrix based on an assessment of said input data with respect to drop placement at adjacent drop locations at a predefined resolution;

receiving said input data at said input resolution; and applying said rules to map said input data to said particular locations in said matrix to generate output data at said output resolution.

17. The method of claim 16, wherein each of said secondary drop locations for a particular color is assigned a pass number of a plurality of pass numbers indicating a particular pass of a printhead in which a particular secondary location of said secondary drop locations can receive an ink drop of said particular color.

18. The method of claim 16, wherein said at least one color includes a plurality of colors, said rules including a rule that no consecutive drops at a predefined resolution of a same color are permitted on a particular pass of a printhead.

19. A method for performing drop placement by an imaging apparatus, comprising:

defining a matrix that identifies all possible drop locations at an output resolution;

defining primary drop locations in said matrix for at least one color based on predefined criteria;

defining secondary drop locations in said matrix for said at least one color;

establishing rules to assign input data received at an input resolution to particular locations of said primary drop locations and said secondary drop locations in said matrix;

receiving said input data at said input resolution;

applying said rules to map said input data to said particular locations in said matrix to generate output data at said output resolution;

receiving said input data at said input resolution;

converting said input data at said input resolution to an intermediate resolution; and applying said rules to map said input data at said intermediate resolution to said particular locations in said matrix to generate output data at said output resolution.

20. The method of claim 16, wherein each of said primary drop locations for a particular color is assigned a pass number of a plurality of pass numbers indicating a particular pass of a printhead in which a particular primary location of said primary drop locations can receive an ink drop of said particular color.

* * * * *